Figure 1:
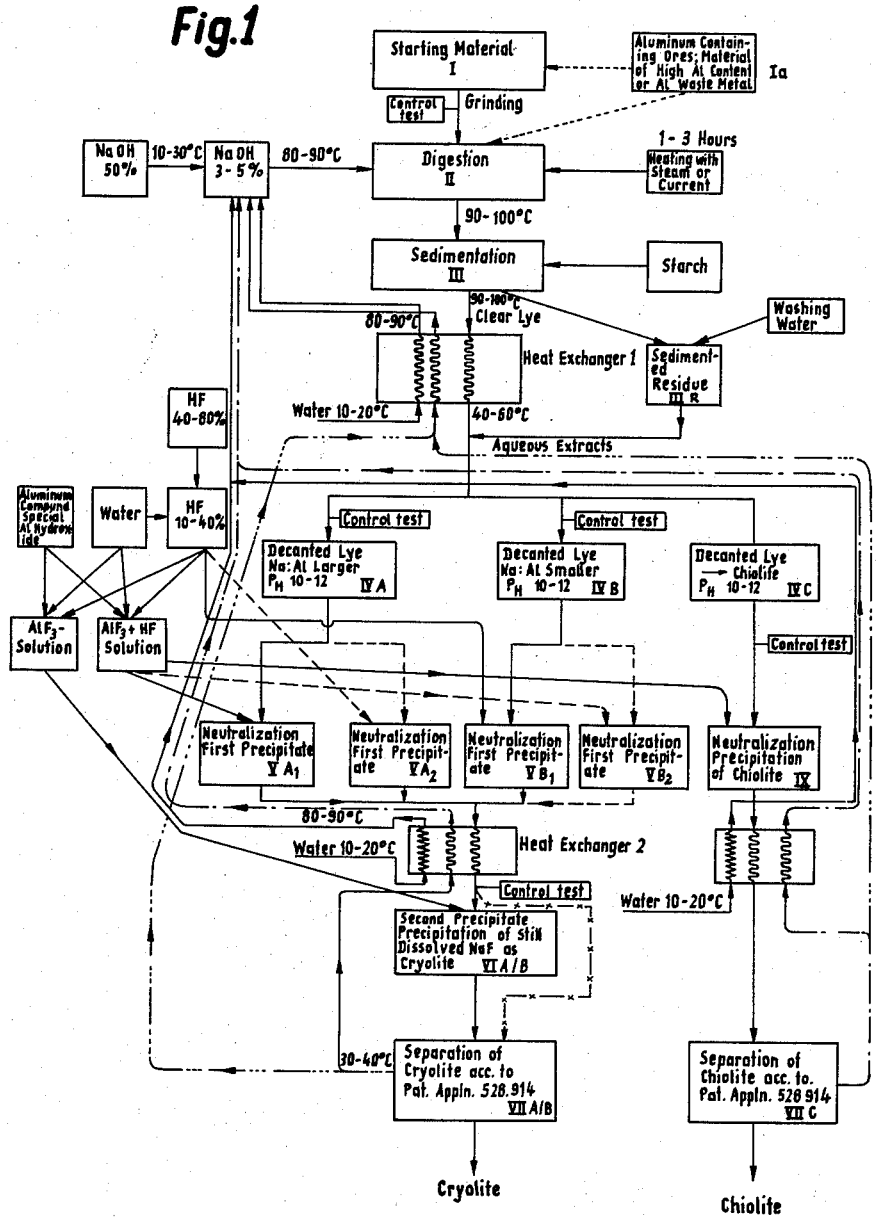
Figure 2:
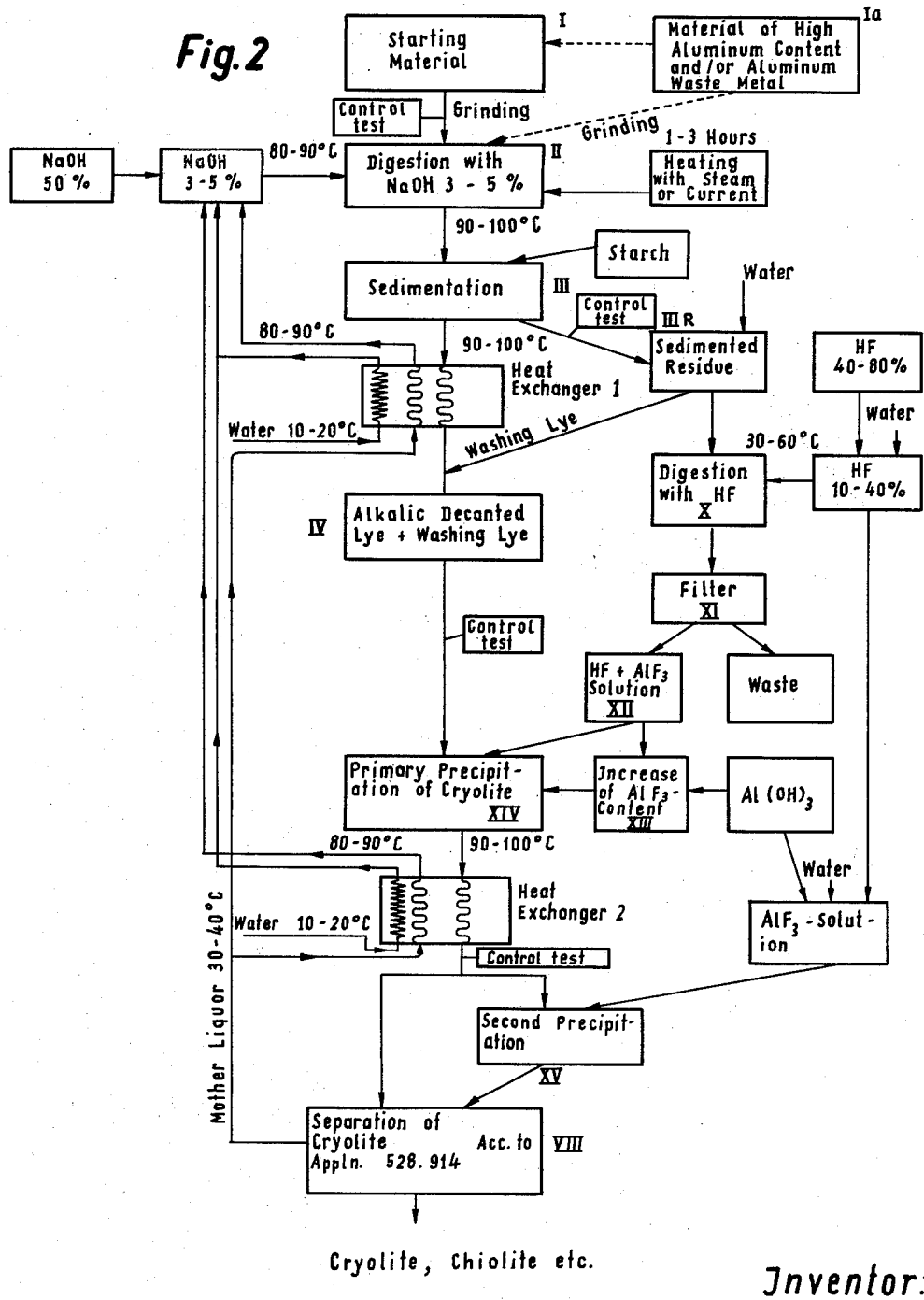

Inventor:
GUENTHER WENDT

July 4, 1961

G. WENDT 2,991,159

METHOD FOR THE PRODUCTION AND RECOVERY
OF SODIUM ALUMINUM FLUORIDES

Filed March 10, 1958

2 Sheets-Sheet 2

Inventor:
GUENTHER WENDT
By Toulmin & Toulmin
Attorneys

United States Patent Office 2,991,159
Patented July 4, 1961

2,991,159
METHOD FOR THE PRODUCTION AND RECOVERY OF SODIUM ALUMINUM FLUORIDES
Guenther Wendt, Toeging (Inn), Germany, assignor to Vereinigte Aluminium-Werke Aktiengesellschaft, Bonn, Germany
Filed Mar. 10, 1958, Ser. No. 720,472
16 Claims. (Cl. 23—88)

The invention relates to the recovery of sodium aluminum fluorides such as cryolite, chiolite or a mixture of both from materials containing fluorine compounds and/or aluminum compounds and/or metallic aluminum.

This application is a continuation-in-part of my pending application S.N. 440,523, filed June 30, 1954, now abandoned.

It is generally known that in the fusion-electrolytic production of aluminum considerable losses of cryolite and alumina are caused by the formation of melt residues or furnace waste containing these substances in admixture with metallic aluminum, aluminum fluoride and sodium fluoride, aluminum carbide, aluminum nitride, sodium oxide and sodium carbonate; in addition thereto certain contaminations such as silica, iron oxides, calcium oxide and calcium fluoride as well as calcium sulfate are often present in the residues from the fusion-electrolytic production of aluminum. During the storage of these residues, the aluminum carbide and aluminum nitride compounds contained therein are decomposed by contact with moist air whereby aluminum hydroxide is produced.

Many suggestions have been made in the art to recover the cryolite from these residues or waste resulting in the fusion-electrolytic production of aluminum. The origin of these wastes or residues is described in detail by John E. Morrow in Patent 1,871,723.

In conformity with these known methods the cryolite and any chiolite, if present, is recovered from the residues of the fusion electrolytic production of aluminum and from similar residues by leaching these residues with alkali, such as caustic soda, neutralizing the resulting solutions with acids or with certain acid salts, such as sodium bicarbonate, and thus causing the precipitation of cryolite from the solution.

One of these known methods is described in the patent to Morrow supra.

To dissolve the cryolite is simple; however, its precipitation from the solution in pure form and free from occluded salts or mixed crystals is extremely difficult, because in conformity with hitherto made experience aluminum hydroxide, aluminum sulfate and other aluminum compounds are precipitated with the cryolite or occluded therewith forming mixed crystals or chemical complexes with the same; moreover, in calcining these impure materials, substantial losses of fluorine are experienced, due to the fact that the aluminum hydroxide which is simultaneously precipitated with the cryolite, only loses its water content after heating to higher temperatures (about 350° C.) and, therefore, causes a hydrolytic cleavage of the cryolite. Therefore, the hitherto known methods for the recovery of the cryolite from the aforesaid residues are clostly and complicated and still lead only to strongly contaminated products.

In the process described in the patent to Morrow supra, the impure cryolite is treated with a diluted caustic soda solution and the cryolite and/or chiolite, if any is present, is precipitated from the solution by neutralization with an acidic substance, and Morrow prefers the pressure introduction of carbon dioxide or the use of sodium bicarbonate.

The use of hydrofluoric acid as the neutralizing agent in this Morrow process appears disadvantageous because the solution obtained from the aforesaid residues with caustic soda is relatively rich in sodium ions and poor in aluminum ions.

Consequently, unduly large amounts of expensive hydrofluoric acid would be required for neutralizing the excess of sodium hydroxide and would be converted into sodium fluoride instead of a sodium aluminum fluoride. The resulting excess of sodium fluoride would then lead to considerable loss of fluorine ions and caustic soda in the waste liquor when filtering off the latter from the precipitated cryolite.

Moreover, that part of the excessive sodium fluoride which becomes occluded and is finally incorporated in the precipitated cryolite, has an undesirable influence on the formation of the melt between cryolite and alumina in the electrolytic bath.

Therefore, Morrow preferred to use carbon dioxide rather than hydrofluoric acid, and obtains only an amount of cryolite slightly less, or at best equal to the amount originally contained in the residue, which amount is furthermore not completely free from impurities such as aluminum oxide and hydroxide, sodium carbonate and possibly sodium sulfite or sodium sulfate. These impurities are either precipitated together with the cryolite or present in occluded mother liquor. Subsequent calcination of the resulting cryolite leads to the formation of sodium oxide and sulfate and may consequently lead to a similar undesirable excess of sodium ions and losses of fluorine ions as described hereinbefore.

In conformity with other known cryolite producing methods, a cryolite results which is heavily contaminated with chlorides, sulfates or silica and therefore is unusable for practical purposes, and in particular for the Hall process of producing aluminum metal.

It is therefore the object of my invention to avoid the drawbacks of the customary cryolite recovery process, and to recover the entire amount of metallic aluminum, aluminum compounds and fluorine compounds and also the sodium compounds contained in the above-described residue, in the form of sodium aluminum fluorides having a high degree of purity.

It is another object of my invention to provide a process for the recovery of aluminum, aluminum compounds and fluorine containing compounds contained in the residues of the nature described, in the form of sodium aluminum fluorides with a minimum requirement of hydrofluoric acid for the process and a minimum of losses of the latter acid.

It is a further object of my invention to provide a process for the recovery of metallic aluminum, aluminum compounds and fluorine containing compounds contained in the residues of the above described type, which process permits to convert this aluminum and/or compounds of aluminum and fluorine thereof, at will, to pure cryolite, pure chiolite or a mixture of both in a desired ratio, and comprises the recovery of these end products with a degree of purity suitable for their reintroduction into the Hall process.

Starting materials suitable for the process according to my invention are the above mentioned residues produced by penetration of the molten alumina bath of the Hall process into the wall and bottom carbon linings of the fusion-electric furnace which residues contain cryolite and alumina, dross resulting from the purification of light metal melts, cinders and/or slag resulting from aluminum casting processes and other alumnium melt, flue dust containing cryolite and alumina recovered from the waste gas of the Hall proces for producing aluminum metal, alumina and fluorides containing sludges of gas washing plants, cryolite containing ores which are greatly contaminated with gangue and any other cryolite containing waste materials, which can be used singly or severally in mixture with each other.

If the aforesaid starting material is relatively poor in aluminum in respect of the sodium and the fluorine content in the resulting lye, for instance, if its Al-content is below 5–10%, it should be mixed with a second aluminum containing material of high, easily digestible aluminum content above, for instance, 30%, which second material can be selected from among aluminum dross, aluminum metal waste, and easily digestible aluminum ores, preferably of the bauxite type. The mixture should be in such proportions of the two components, that the soluble portion of aluminum in respect to the portion of sodium in the solution corresponds to the stoichiometric proportion required for obtaining the aforesaid sodium aluminum fluoride salt.

All percentages given in this specification and the appended claims are by weight.

The objects set forth hereinbefore are attained by the process according to my invention which comprises:

(A) Dissolving aluminum, sodium and fluorine (as ions) from the starting material or mixture of materials containing aluminum or aluminum compounds, as well as fluorine compounds by leaching the materials with caustic soda solution;

(B) Controlling the contents of the resulting solution containing the dissolved aluminum and fluorine containing compounds, after the solution has been separated from the insoluble residues, by taking samples for control tests or analyses, and, if, as is always the case in practical operation, the molecular ratio of Al relative to that required for complete cryolite formation is too low, increasing the percentage of alumina by adding an aluminum fluoride solution to the solutions to be precipitated; and (C) Precipitating cryolite (or a sodium aluminum fluoride salt consisting of a mixture of cryolite with chiolite, or pure chiolite) from the adjusted solution (B) by the admixture of an aqueous hydrofluoric acid solution;

(D) Precipitating sodium fluoride being in excess by neutralization of the lye to cryolite or other sodium aluminum fluorides by a simultaneous admixture of aluminum fluoride to the neutralizing hydrofluoric acid or by addition of the aluminum fluoride to the rest of the lye after neutralization.

Preferably, in carrying out step (A), the starting material or mixture of the materials is digested with an aqueous caustic soda solution containing 3 to 5% of NaOH, at a temperature of about 90 to 100° C., to obtain (a) an aqueous solution of alkaline pH (above 7), which has disssolved therein fluorine, aluminum and sodium (in the form of ions), and (b) suspended in this solution a solid, leached residue which may still contain a portion of the aluminum originally present in chemically bound form in the starting materials.

The aqueous alkaline solution (a) is then separated from the solid, leached residue, for instance, by sedimentation and decantation and/or filtration.

The sodium and fluorine contents of the solution destined for the subsequent precipitation of cryolite is controlled and so adjusted with respect to the quantity of dissolved Na and F that the latter are present, preferably in the form of sodium fluoride and aluminum fluoride components, in molar ratios of:

$$mol_{Na}:mol_{Al}=3:1$$

As has been mentioned above, the deficit of aluminum always existing in practice is made up by the addition of corresponding amounts of Al, preferably in the form of aluminum fluoride.

The latter may be added separately, or in mixture with the hydrofluoric acid required for neutralizing the alkaline solution and thereby causing a substantially completely stoichiometric precipitation of the sodium aluminum fluorides, with a high degree of purity, above 90%, and consisting, depedent upon the ratio of Na:Al, of cryolite, or of a mixture of cryolite with chiolite, or of pure chiolite.

In cases where the presence of greater quantities of non-hydrated alumina in the starting materials being residual products from aluminum electrolysis plant furnaces and the like renders the extraction with caustic soda difficult, and, therefore, no guarantee prevails for a sufficiently high rate of aluminum in the solution, I have found it advisable as another mode of operation and in the interest of increased economy of the process of my invention, to cause the hydrofluoric acid needed for the precipitation of cryolite and the like, to first act on the residue from the alkaline digestion step so as to extract therefrom the residual aluminum oxide or other residual aluminum compounds still retained in that residue, and to perform the precipitation of the cryolite with the hydrofluoric acid now containing dissolved therein aluminum fluoride from the aforesaid treatment of the residue, by combining the two solutions.

According to another important feature of my invention, I may make up the afore-mentioned aluminum deficit by adding aluminum metal or aluminum compounds for instance of a lower degree of purity in the form of dross from castings, easily decomposable aluminum ores or waste metal, which are easily soluble in alkali, to the starting material or to the aforesaid aqueous alkaline solution, in such amounts that a complete stoichiometrical conversion of the entire sodium, aluminum and fluorine in the solution to pure sodium aluminum fluorides is achieved.

It is, however, not necessary to make up the aforesaid aluminum deficit by addition of the aforesaid materials to the alkaline solution, but such deficit can be compensated later in connection with the neutralization of the hydrofluoric acid used, or after the neutralization step. In the latter instances, it is necessary that the aluminum material added is of sufficient purity. Thus, the aluminum metal or aluminum compounds such as freshly precipitated, non-calcined aluminum hydroxide may be added directly to the hydrofluoric acid used for neutralization.

However, I prefer to react the sufficiently pure aluminum metal, aluminum hydroxide or other aluminum compounds with hydrofluoric acid to obtain a clear hot solution of aluminum fluoride, which is then added while still hot, preferably after neutralizing the aforesaid aqueous alkaline solution with hydrofluoric acid so as to obtain a secondary precipitation of cryolite or another desired sodium aluminum fluoride in the solution. Or the AlF$_3$ solution may be added together with an excess of hydrofluoric acid present in the clear, hot solution of aluminum fluoride to the alkaline solution. The aluminum fluoride solution and hydrofluoric acid may also be added separately but simultaneously to the alkaline solution.

The clear, hot aluminum fluoride solution may also be obtained by the process described in my Patent 2,783,128.

The process according to my invention shall be further described hereinafter with the aid of the accompanying drawings in which Flow Sheet 1 illustrates a first mode of operation of that process; and Flow Sheet 2 illustrates another mode of operation of the same process.

As will be seen from the mode of operation illustrated in Flow Sheet 1, the first step of the process according to my invention involves the dissolution of the metallic aluminum and of the aluminum and fluorine compounds contained in the starting materials (step I) by first grinding these materials to a grain size smaller than 1 millimeter, and digesting (step II) the ground material with an aqueous solution of sodium hydroxide having a concentration of 3 to 5% by weight and a temperature of about 90–100° C.

This sodium hydroxide solution is prepared by mixing, for instance, a sodium hydroxide solution of 50% by weight, with hot water having a temperature of about 80–90° C. and obtained from a heat exchanger 1.

The temperature of the digestion mixture comprising the ground starting material and the sodium hydroxide solution of 3 to 5%, is raised from about 80–90° C., which latter temperature is partly due to the heat of solution of sodium hydroxide of 50% concentration in the hot water, to a temperature of 90 to 100° C. and is maintained at this temperature during the entire digestion step, lasting about three hours, for instance by heating with indirect steam.

The cryolite, the aluminum oxide or aluminum hydroxide as well as metallic aluminum contained in the starting materials in different ratio are dissolved in accordance with the following equations:

$$Na_3AlF_6 + 4NaOH = NaAlO_2 + 6NaF + 2H_2O$$

$$Al(OH)_3 + NaOH = NaAlO_3 + 2H_2O$$

$$2Al + 2NaOH + 2H_2O = 2NaAlO_2 + 3H_2$$

Corresponding equations can easily be set up by anyone skilled in the art for the dissolution of aluminum carbide and similar aluminum compounds that may also be contained in the starting materials.

In conformity with the molecular relationship of the two initial materials, namely, cryolite and aluminum hydroxide, these reactions may take place successively or simultaneously.

The amount of caustic soda to be added depends upon the presence of soluble aluminum and of the soluble compounds of sodium, aluminum and fluorine in the starting materials, and addition of an excess of alkali is required to maintain the aluminates in solution.

The resulting lye containing dissolved all or part of the aluminum containing compounds and substantially the entire amount of fluorine containing compounds from the starting materials is then subjected to a sedimentation (step III) in order to separate that part of the starting materials that has remained undissolved in the sodium hydroxide solution. While this step usually requires 2 to 3 days, it can be accelerated in such a manner that 100 cubic meters of lye sediment out in about 10 minutes, by adding to the aforesaid amount of lye 5 to 10 kilograms of starch or 20 kilograms of gelatine dissolved in about 100 liters of hot water, or about 50 to 100 liters of buttermilk, which adjuvants serve as a sedimenting agent. The supernatant lye is then decanted from the sedimented residue (IIIR). If the aluminum content of the latter is, for instance, below about 3–5%, this residue can be discarded.

The sedimentate is preferably twice extracted with water amounting each time to about one tenth of the original lye volume. The aqueous extracts are combined with the decanted lye. The decanted lye flows through heat exchanger 1 in which the temperature of the hot lye decreases to about 50 to 60° C., while, at the same time about 100 cubic meters of hot lye serve to heat 40 to 50 cubic meters of water or waste lye having an initial temperature of 10 to 15° C., to a temperature of about 80 to 90° C.

If aluminum is present in the starting material only in amounts which are inferior to those required for forming cryolite stoichiometrically with the quantities of sodium and fluorine ions required for the leaching and consequently for the neutralization step, then it is possible to make up for this aluminum deficit already at this early stage of the process according to the invention, by adding, as step IA thereof, aluminum containing materials to the starting material I or to the digestion mixture II. Since the additional aluminum-containing materials undergo the step III of separation from the residues insoluble in the lye, when added at I or II, it is permissible to use for this purpose materials of lesser purity such as aluminum metal wastes, or aluminum-containing materials such as aluminum dross from casting plants, ball mill dust from the dross processing plant, easily decomposable aluminum ores or the like.

Experimental tests or control analyses are carried out at this stage to determine the amount of acid required for the neutralization of the resulting decanted lye and, furthermore, to determine, preferably by direct titration, the excess of sodium fluoride over the required Na:Al ratio.

Titration of the sodium fluoride content of the lye is well known to anyone skilled in the art and described, for instance by R. J. Rowley and H. V. Churchill, Ind. Eng. Chem., Anal. Ed. vol. 9 (1937), page 551.

Depending on the composition of the lye and the nature of the sodium aluminum fluorides to be obtained from the sedimentation step III, the decanted lye can be further treated according to three different modes (IVA, IVB and IVC).

If the decanted lye, which has a pH of about 10 to 12 and has dissolved therein sodium, aluminum and fluorine, contains the former two components in a large ratio relative to each other, mode of operation IVA is preferred. If that same ratio is relatively small, i.e. if there is more aluminum present in the solution than in the first instance, mode IVB is applied.

If it is desired to produce chiolite instead of cryolite, the next following stage of the process is carried out according to mode IVC.

As an important condition for successfully carrying out the process according to the invention, care must be taken that there is always an excess of sodium over aluminum present in stage IV of the process. There exists a limit ratio of Na:Al, below which ratio, i.e. if there is too much aluminum present, the sodium aluminate will be decomposed and aluminum hydroxide will precipitate. In order to avoid this drawback of the solution becoming instable, the Na:Al ratio must always be held above a limit ratio which is from 1 to 2 moles of NaOH:1 mole of NaAlO$_2$, if there are no other sodium salts present in aqueous solution. If such salts are present, and this is usually the case, for in the decanted lye there are always contained sodium fluoride and possibly also sodium sulfate, the sum total of sodium must be even higher than 1 to 2 moles of NaOH, since sodium fluoride and sodium sulfate contribute less to the stability of the sodium aluminate solution than sodium hydroxide.

According to mode IVA, if a control analysis has shown that the actual ratio of Na:Al is very much larger than the aforesaid limit ratio, that actual ratio is decreased to nearer the limit ratio by adding to the decanted lye preferably a solution of fluoric acid and aluminum fluoride, whereby not only the amount of hydrofluoric acid required for neutralization, but also aluminum for covering the aluminum deficit for a complete cryolite formation is added. Cryolite precipitation then occurs according to process step VA$_1$.

Under certain less frequent conditions it may be desirable to add hydrofluoric acid alone for the purpose of neutralization to the lye of the type IVA, in which case an excess of sodium fluoride will be available in the solution above the amount which precipitates as cryolite, which excess is due to the low content of aluminum ions present (neutralization step VA$_2$). The deficit of aluminum should then be corrected by later addition of a pure aluminum fluoride solution, thereby causing a secondary precipitation of cryolite in the lye (VIA/B).

If the control test or control analysis show that according to mode IVB the actual ratio of Na:Al is only slightly above the aforesaid limit ratio, it is preferable to add only hydrofluoric acid for neutralization to the decanted lye without any addition of aluminum fluoride (VB$_1$) and thus to obtain a first precipitation of cryolite.

An eventual deficiency in aluminum in the lye should again be adjusted by the addition of $AlF_3$ to obtain a secondary precipitation of cryolite (VIA/B). Of course, it is also possible to add $AlF_3$ concurrently with HF and obtain a complete precipitation ($VB_2$) which would, however, lead to the formation of a sodium aluminum fluoride precipitate, the stoichiometric proportions of which would lie intermediate those of cryolite and chiolite, and the more toward the latter, the greater the excess of $AlF_3$ added.

If it is desired to produce chiolite having the formula $5NaF.3AlF_3$ instead of cryolite, this can be achieved according to mode IVC of the method according to my invention. After the composition of the decanted lye has been determined by control analysis, I add to the lye a mixture previously prepared in the required stoichiometric quantities of hydrofluoric acid and aluminum fluoride which serves for neutralizing the lye and precipitating therefrom at the same time a sodium aluminum fluoride consisting of chiolite (step IX).

Of course, it is also possible to prepare either cryolite or any desired mixture of cryolite and chiolite in this manner by selecting the corresponding stoichiometric amounts of hydrofluoric acid and aluminum fluoride in the mixture to be used for step IX.

For neutralization of the lyes IV(A–C) there is used a hydrofluoric acid of 10 to 40% HF content which is prepared from a concentrated hydrofluoric acid of 40 to 80% concentration by dilution with water.

As has been mentioned before, the aluminum fluoride solution to be used is preferably freshly prepared as described in my Patent 2,783,128.

The heat of reaction released during the neutralization step raises the temperature of the solution $V(A_1, A_2, B_1, B_2)$ almost to boiling temperature. Thereupon the hot solution from step V is passed through a second heat exchanger 2 in which the temperature of the solution is decreased while heating water or a liquor, the origin of which will be described hereinafter, to a temperature of about 80 to 90° C., which hot water or liquor is then used also for the preparation of the above mentioned sodium hydroxide solution required for digestion step (II).

The cold neutralized solution containing the first cryolite precipitate is then checked with regard to the remaining content therein of sodium fluoride by a control analysis and the stoichiometrically required amount of a hot, freshly prepared solution of aluminum fluoride is added to the solution (step VIA/B), thereby effecting a second precipitate of cryolite and avoiding the drawbacks of an excess of sodium fluoride desribed hereinbefore.

Furthermore, if the solutions IV (A–C) have been so adjusted by additions of hydrofluoric acid and/or aluminum fluoride, prior to the precipitation of cryolite according to V that the constituents aluminum, fluorine and sodium are present therein in the stoichiometrical proportions required for the formation of cryolite, then it is, of course, superfluous to add further aluminum fluoride since no further precipitation of cryolite according to VIA/B will occur. Rather, under the aforesaid conditions, the treatment of the reaction mixture continues after passing the same through heat exchanger 2, directly according to step VIIA/B. For similar reasons, no secondary precipitation of chiolite is required, since the quantitative proportions for obtaining this product must be adjusted anyhow beforehand to exact stoichiometrical amounts of the constituents.

The first and eventually the second cryolite precipitates are then separated from the mother liquor by a conventional method or, preferably, by the method described in my pending United States patent application Ser. No. 528,914, filed August 17, 1955, and the pending continuation-in-part thereof filed on January 23, 1958, under Serial No. 710,721.

I prefer to utilize the mother liquor still having a temperature of 30 to 40° C. from the separation step (VIIA/B) according to my application supra by passing the same through the second heat exchanger as described hereinbefore. If sufficient warm mother liquor is available, I prefer to pass the same instead of the above mentioned cold water through the first heat exchanger, thereby saving further heat energy. In this manner, I also recover small quantities of fluorine which is eventually still present in the mother liquor from step VIIA/B in amounts of about 0.1 to 0.4 grams per liter.

Another advantage of using mother liquor instead of water for recycling in the process resides in the fact that there is left no problem of disposing of waste water.

The precipitation of cryolite takes place dependent upon the constituents and quantitative proportions present in the solution, for instance, according to the following equations:

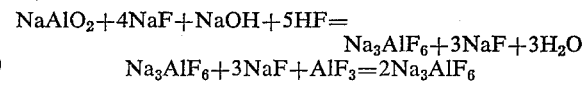

$$Na_3AlF_6 + 3NaF + AlF_3 = 2Na_3AlF_6$$

if one gram mole of sodium aluminate and one gram mole of sodium fluoride happen to be present, admixture of hydrofluoric acid will occur in conformity with the equation:

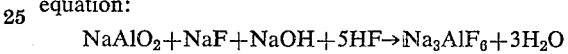

The aforesaid complete separation of the cryolite, for instance in steps V and VI is thus effected by controlling the contents of sodium and aluminum and the total contents of fluorine in the solution in such a manner, that the total amount of these components is quantitatively converted into cryolite, which is achieved by providing that the components required for the formation of cryolite, namely sodium fluoride and aluminum fluoride, are caused to be present at a molecular ratio of 3:1.

As is apparent from the above equation and from the method according to my invention described hereinbefore, substantially no by-products are contained in the cryolite precipitated in steps V and VI and a final product of high purity can be obtained.

Only if sodium and aluminum would be present in the decanted lye in the exact stoichiometric ratio of 3:1, would it be sufficient to neutralize this solution with acid alone as implied by Morrow. However, in practice, and due to the fact that part of the sodium in the decanted lye is always present in the form of sodium fluoride and possibly sodium sulfate, the aforesaid ratio could only occur in an unstable solution, from which part of the sodium aluminate present would be decomposed.

It is now possible that the content of aluminum in the above-mentioned sedimented residue (IIIR) is still relatively high (at least about 3 to 5%) due to the starting materials containing aluminum compounds which are difficultly soluble in sodium hydroxide solution.

If this is the case, the residue (IIIR) is processed according to another important mode of carrying out my invention, illustrated in Flow Sheet 2, which mode comprises, as a next step X, digesting the residue IIIR with an excess of hydrofluoric acid having a concentration from 10 to 40% by weight of HF.

This hydrofluoric acid which has a temperature of about 30 to 50° C. is prepared from a concentrated acid containing about 40 to 80% by weight of HF by diluting the latter with water. Thereby, the hydrofluoric acid which is needed for the precipitation of cryolite in step V, is first caused to act upon the sedimented residue (IIIR) and dissolves at least partly the unhydrated aluminum oxide or similar difficultly soluble aluminum compounds still present in the residue, whereby the hydrofluoric acid is caused to contain a varying amount of aluminum fluoride. Thus, at the slightly increased temperature of step (X), for instance a residual portion of alumina is dissolved as aluminum fluoride in conformity with the equation

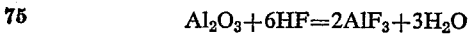

The mixed solution of hydrofluoric acid and aluminum fluoride is separated from the insoluble residue such as, for instance, carbon, by filtration (XI), for instance in a vacuum filter. The filtrate (XII) is checked by control analysis to determine its content of hydrofluoric acid and of aluminum fluoride, and, if required by the control analysis made of the decanted lye (IV), the aluminum fluoride content in filtrate (XII) is still increased by dissolving therein easily soluble aluminum hydroxide (step XIII).

Thereupon, depending on the control analysis of decanted lye IV and filtrate XII with or without enrichment in AlF$_3$ by step XIII, these two solutions (IV and XII) are combined in such manner, for example, that in the combined solution, there are present equimolecular parts of sodium fluoride, sodium aluminate and aluminum fluoride which react with each other according to the equation

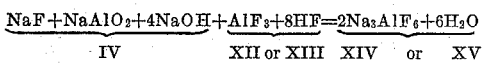

$$\underset{\text{IV}}{\text{NaF}} + \underset{\text{XII or XIII}}{\text{NaAlO}_2 + 4\text{NaOH}} + \underset{\text{XIV}}{\text{AlF}_3} + \underset{\text{or}}{8\text{HF}} = \underset{\text{XV}}{2\text{Na}_3\text{AlF}_6 + 6\text{H}_2\text{O}}$$

The equation will undergo a change in conformity with a change of the molecular proportions of the starting materials. The contents of the combined solution of sodium and fluorine compounds should be so adjusted as to obtain a quantitative separation of the total aluminum being in solution after the leaching procedure, and the fluorine contained in the furnace residues while considering that the sodium fluoride and the aluminum fluoride required for the creation of the cryolite must be present at a molecular ratio of 3:1. This offers the advantage that no by-products are produced, which is the great drawback of the known art because of the necessary regeneration of the same.

If, after the primary precipitation of cryolite in the combined solution XIV, a control analysis shows that there is still an excess of sodium fluoride present, a secondary precipitation of cryolite is effected by adding to the solution an additional stoichiometrically required amount of aluminum fluoride (step XV).

Prior to the control tests, the cryolite containing solution XIV is passed through a heat exchanger 2 in which it transfers part of its heat content to the mother liquor from the separation step VIIA/B which has been described in detail in connection with FIG. 1.

In the practical performance of the above described two step variation of the instant process, which embraces the hydrated as well as the water-free parts of alumina of the residue products of the furnace, a total recovery results of 85 and more percents of aluminum and the recovery of fluorine and of sodium amounting to over 90 percent.

The invention enables the production of a very pure cryolite having, for instance, the following composition:

96.80% Na$_3$AlF$_6$
0.45% H$_2$O
0.40% Na$_2$SO$_4$
0.90% AlF$_3$
0.80% Al$_2$O$_3$
0.11% Fe$_2$O$_3$
0.09% SiO$_2$
—% Cl

The purity of this product exceeds by far the purity of the cryolite product in conformity with the hitherto customary processes, which processes, for instance, consist of a single-step leaching process with mineral acids or of an alkaline leaching step and a subsequent precipitating step by introduction of carbon dioxide and generally lead to products having a percentage of only 70 to 90% Na$_3$AlF$_6$, while the cryolite obtained according to the process of the invention, has a degree of purity of 90–97% Na$_3$AlF$_6$.

The economy of the invention is based upon its simplicity and the use of small quantities of auxiliary materials to be added continuously which enter the process and are retained in the final product, moreover, the invention guarantees a high output of a pure cryolite and a satisfactory utilization of the hydrofluoric acid employed.

The instant process based on the use of sodium hydroxide solution and hydrofluoric acid and the following precipitation of the cryolite with pure or eventually aluminum-fluoride-containing hydrofluoric acid may be well used for the treatment of other cryolite and alumina containing materials; it may, for instance, be well used for the treatment of the dross resulting from the purification of light metal melts, for the treatment of the sludges of gas washing plants, of cryolite and alumina containing fine dust and of cryolite carrying minerals which are greatly contaminated with gangue.

Since the extraction of the alumina contained in the waste products of the fusion-electrical furnaces can be made easier by an increase of the percentage of alumina hydrate, a storage of the furnace waste materials in moist air is advisable as in this manner aluminum compounds, which are not easily dissolved in sodium hydroxide but may be easily decomposed into aluminum hydroxide, are converted into this latter aluminum compound. Under normal climatic conditions of the temperate zone storage can take place in the open air.

The invention is further illustrated by a number of examples given below which are, however, not meant to be limitative in any way.

*Example 1*

One ton of waste carbonaceous cell-linings from an aluminum electrolysis plant furnace, an analysis of which waste carbonaceous cell-linings reveals a content of:

| | Percent |
|---|---|
| Na | 11.5 |
| Al | 19.5 |
| F | 15.0 | are ground to a grain size of less than 1 mm. and then digested in 10.5 cubic meters (m.$^3$) of an aqueous sodium hydroxide solution having a content of 5% by weight of NaOH, during two hours at a temperature of 98° C. (Flow Sheet 1, step II). The digested residue IIIR is then separated by sedimentation (III), washed with water, and the aqueous extracts therefrom obtained by filtration or decanting are combined with the clear lye from step III which has been passed through a heat exchanger 1 wherein it is cooled to a temperature of between about 40–60° C. The combined clear liquors are then treated according to process step IVB, by neutralizing the lye with 2,500 liters of a hydrofluoric acid containing 20% by weight of HF (step VB). The amount of hydrofluoric acid was determined by an experimental test. After the first precipitation of cryolite occurring in the lye, the same is passed through another heat exchanger 2 and the entire amount of an aluminum fluoride solution is then added to the lye in order to recover the unconverted sodium fluoride still present therein, which aluminum fluoride solution has been obtained from a slurry of 90 kilograms (kg.) of aluminum hydroxide, having an Al$_2$O$_3$ content of 55%, in water and addition of 70 kg. of a hydrofluoric acid containing 80% by weight of HF. The resulting hot, freshly prepared fluoride solution is added immediately to the neutralized lye according to step VB under thorough mixing, and a secondary precipitation of cryolite in the lye is obtained (step VIB). The entire cryolite suspended in the lye is then separated, for instance according to the process described in my pending patent application Serial No. 528,914, filed August 17, 1955, and the continuation-in-part thereof supra, from the mother lye, and, after drying, a total amount of about 1.3 tons of cryolite having a Na$_3$AlF$_6$ content of 95% is obtained.

An analysis of the final product reveals the following composition:

| | Percent |
|---|---|
| F | 52.9 |
| Na | 31.4 |
| Al | 13.1 |
| $Fe_2O_3$ | 0.10 |
| $SiO_2$ | 0.10 |
| $SO_4$ | 0.25 |

*Example II*

One ton of flue dust from the exhaust system of the furnaces in an aluminum electrolysis plant, which flue dust has a composition determined by analysis of

| | Percent |
|---|---|
| Na | 15 |
| Al | 19 |
| F | 25 |
| $Fe_2O_3$ | 7 |
| $SiO_2$ | 2 |

Balance—32%, mainly carbon and tar is digested during one hour at a temperature of about 95° C. in 16 m.³ of an aqueous sodium hydroxide solution containing about 5% by weight of NaOH (Flow Sheet 1—step II). The lyes and residue are then treated in the same manner as in Example I up to the taking of an experimental test. The lye is neutralized according to process step $VA_1$ with about 2,300 liters of a hydrofluoric acid having an HF content of 33% by weight, in which about 200 kg. of aluminum hydroxide, having an $Al_2O_3$ content of about 55% by weight, have been previously dissolved. This aqueous mixture of free hydrofluoric acid and aluminum fluoride is added in sufficient amounts to the alkaline lye to neutralize the same (step $VA_1$). No secondary precipitation will normally be required. After separation, as in Example I, the cryolite sludge separated from the mother liquor is dried and about 1,900 kg. of cryolite, having a $Na_3AlF_6$ content of 96% are obtained.

Analysis of the final product show the following composition:

| | Percent |
|---|---|
| F | 53.3 |
| Na | 31.8 |
| Al | 13.2 |
| $SiO_2$ | 0.20 |
| $Fe_2O_3$ | 0.20 |
| $SO_4$ | 0.35 |

*Example III*

One ton of flotation residues from the flotation treatment of cryolite occurring in nature, which residues have a content of about 70% of cryolite, the balance consisting of barite, fluorspar, iron oxides and silicates, and having a grain size of less than 1 mm., is dissolved in 18 m.³ of an aqueous sodium hydroxide solution containing 3% by weight of NaOH at a temperature between 95 and 100° C. (Flow Sheet 1, step II). After the lye has been separated from the residue and cooled, and the washings from the residue have been added thereto as described in detail in Example I, this lye corresponding to IVA, is treated further by adding thereto, and with stirring, 2.6 m.³ of an aluminum fluoride solution containing 150 gr. of aluminum fluoride per liter, and then adding thereto a sufficient quantity of hydrofluoric acid having a content of 25% by weight of HF until the lye is neutralized. Approximately 1,050 liters of hydrofluoric acid will be required for this neutralization step (step $VA_2$ and VIA combined). No secondary precipitation of cryolite will be required. Separation and drying of the resulting cryolite sludge in accordance with Example I yielded about 1.6 tons of a cryolite having a high degree of purity (above 95%).

*Example IV*

One ton of air-slaked, strongly alkaline waste carbonaceous cell-linings from furnaces of an aluminum electrolysis plant, which waste linings have a content of

| | Percent |
|---|---|
| Na | 16 |
| Al | 8 |
| F | 20 |

Balance—56% consisting of carbon, moisture and impurities admixed with 200 kg. of skimmings and dross of an aluminum casting plant, which latter materials have a content of 10% of metallic aluminum and about 75% of aluminum oxide. The mixture is ground to a grain size of less than 1 mm. and then digested in about 16 m.³ of an aqueous sodium hydroxide solution containing about 3% by weight of NaOH, during approximately three hours and at a temperature between 95 and 100° C. (Flow Sheet 1, step II). The residue IIIR is then separated (step III) from the lye, which is then cooled in heat exchanger 1 and combined with wash waters from the residue, as described in Example I, whereupon an experimental test is made. For reason of this test result, the lye is neutralized according to process step $VA_1$ with 2520 liters of an aqueous hydrofluoric acid containing 20% by weight of HF and in which 80 kg. of an aluminum hydroxide containing 55% of $Al_2O_3$ have been previously dissolved. A single precipitation is normally sufficient and, after further separation and drying in accordance with Example I, 1.3 tons of cryolite, having a degree of purity of about 94%, are obtained.

*Example V*

One ton of waste carbonaceous cell-linings similar to those treated in the previous examples but containing 14% of sodium
23% of aluminum and
17% of fluorine is ground to a grain size below one millimeter (Flow Sheet 2, step I), and is then digested (step II) with 17.5 m.³ of an aqueous sodium hydroxide solution containing 3.6% by weight of NaOH, during two hours at a temperature of about 100° C. The necessary digesting agent is prepared from 865 liters of an aqueous sodium hydroxide solution containing 50% by weight of NaOH and from about 16.5 m.³ of a recycled lye which has been heated in the heat exchangers 1 and/or 2 to a temperature of about 88° C.

After the digestion has been completed, 1 kg. of starch in the form of a slurry in 5 liters of hot water is added to the lye and, after 15 minutes' sedimentation time (III), the supernatant, clear lye is drawn off and cooled to 50° C. in heat exchanger 1, whereby about 7 m.³ of a recycled lye, having a temperature of 30° C. are reheated to a temperature of 90° C.

The undissolved residue IIIR is washed with water and the washing lye or lyes are combined with the alkaline lye in step IV. From the washed residue IIIR amounting to about 650 kg., a sample is analyzed and reveals a content of 5% sodium
10.6% aluminum, and
5.2% fluorine The residue is therefore treated in 2.75 m.³ of an aqueous hydrofluoric acid containing 24% by weight of HF at a temperature of about 50° C. (step X). A considerable portion of the aluminum, fluorine and sodium contained in the residue is thus dissolved. The insoluble residue is filtered off (step XI), washed and discarded as waste amounting to about 600 kg., and after an analysis thereof reveals a content of only

| | Percent |
|---|---|
| Sodium | 2.3 |
| Aluminum | 5.8 |
| Fluorine | 2.5 |

The hydrofluoric extract (XII) is further enriched in aluminum by dissolving therein 35 kg. of an aluminum hydroxide containing about 55% by weight of $Al_2O_3$ and the resulting hydrofluoric solution, the alkaline lye and eventually obtained wash waters are then combined (step XIV), thus causing a precipitate of cryolite in the combined liquor. The lye of step XIV which has been heated during the neutralization and precipitation of cryolite to about 95° C. is passed through heat exchanger 2 and cooled therein to 50° C., while simultaneously 9 m.³ of recycled waste lye, having a temperature of 30° C., are heated to 85° C.

The cryolite precipitate is then separated and preferably centrifuged, for instance, according to the process described in my pending application and the continuation-in-part thereof supra. The resulting clear mother liquor is then recycled through heat exchangers 1 and/or 2 and used for the preparation of fresh aqueous sodium hydroxide solution for process step II. The thick cryolite sludge obtained from step VIII is dried and yields about 1.6 tons of a pure cryolite having a $Na_3AlF_6$ content of 95%. Analysis of the final product reveals contents of

| | Percent |
|---|---|
| Na | 31.38 |
| Al | 12.86 |
| F | 52.49 |
| $Fe_2O_3$ | .15 |
| $SiO_2$ | .20 |
| $SO_4$ | .29 |

*Example VI*

The previous example is repeated but a control analysis of a sample of mother liquor obtained by filtering a small portion of the suspension XIV resulting from the primary precipitation of cryolite in the process according to Flow Sheet 2, reveals that that precipitation is not complete, an excess of sodium and fluoride ions remaining in the mother liquor. Therefore, a pure aluminum fluoride solution obtained in the manner as described in Example I is added in an amount of one-third of a mole for every mole of sodium fluoride still present in the mother liquor. A second precipitate of cryolite is thus obtained (step XV), and the liquor containing the first and second precipitate is then further treated as described in the preceding example (step VIII).

*Example VII*

One ton of waste carbonaceous cell-linings of the same type as used in the preceding examples and containing 15% of sodium
23% of aluminum, and
18% of fluorine is to be processed to obtain chiolite. The material is ground to a grain size of less than one millimeter and then digested (Flow Sheet 2, step II) for about two hours at about 100° C., with 17.5 m.³ of an aqueous sodium hydroxide solution containing 4.5% by weight of NaOH. The undissolved residue (IIIR) is separated (step III) and washed, and is then further digested (step X) for one hour with 10.5 m.³ of an aqueous hydrofluoric acid containing 12% by weight of HF and having a temperature of 60° C. After separating (step XI), the insoluble waste residue, the hydrofluoric acid solution containing further sodium, aluminum and fluorine dissolved therein, is diluted with about 4 m.³ of water having a temperature of 15° C. (XII) and its aluminum content is then increased by adding thereto (step XIII) 760 kg. of aluminum hydroxide containing about 55% of $Al_2O_3$. The aluminum hydroxide is dissolved in a solution XII as aluminum fluoride. The still hot and acidic solution XIII is then combined with the alkaline lye IV and the wash waters in such quantities, depending on the experimental test of lye IV, that 2.45 tons of chiolite are precipitated. The chiolite precipitate is then separated, no second precipitation being normally required, and dried as described in the previous example. Its composition is:

| | Percent |
|---|---|
| Na | 24.6 |
| Al | 17.5 |
| F | 57.1 |
| $Fe_2O_3$ | 0.20 |
| $SiO_2$ | 0.17 |
| $SO_4$ | 0.20 |

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What is claimed is:

1. A method of producing cryolite of at least 90% purity from materials containing compounds of aluminum with fluorine, comprising the steps of leaching said materials with aqueous sodium hydroxide solution so as to obtain a first aqueous solution of alkaline pH having dissolved therein compounds including fluorine, aluminum and sodium, and also to obtain a solid residue still containing a portion of aluminum originally contained in said materials; separating said first aqueous solution from said solid residue; leaching said solid residue with aqueous hydrofluoric acid so as to obtain a second aqueous solution of acidic pH having dissolved therein compounds including aluminum and fluorine and also to obtain another solid residue; separating said second aqueous solution from said other solid residue; and combining said first aqueous solution with said second aqueous solution, thereby forming a precipitate consisting of cryolite having a purity higher than 90%.

2. A method as defined in claim 1 wherein the concentrations of aluminum, sodium and fluorine, respectively, in said first and second aqueous solutions and the relative quantities of said first and second aqueous solutions are so adjusted, respectively, that upon combining said first aqueous solution with said second aqueous solution substantially all of the sodium, aluminum and fluorine contained in said combined first and second solutions are precipitated in the form of cryolite.

3. A method of producing cryolite of at least 90% purity from aluminum and fluorine compounds containing materials and comprising the steps of leaching said materials with aqueous sodium hydroxide solution so as to obtain a first solution containing dissolved therein compounds containing the major portion of the fluorine, aluminum and sodium present in alkali-soluble form in said materials and to obtain a solid residue; separating said first solution from said solid residue of said materials; leaching said solid residue with aqueous hydrofluoric acid so as to obtain a second solution containing dissolved therein compounds including aluminum and fluorine; and aqueous solution from said other solid residue and combining a determined quantity of said first solution with a determined quantity of said second solution, the respective quantities of said first and second solutions each containing determined concentration of aluminum, fluorine and sodium, being so chosen that the relative quantities of sodium, aluminum and fluorine, respectively, in the combined mixture of said first and second solutions correspond to the stoichiometric ratio of Na:Al:F in cryolite, thereby forming a precipitate consisting essentially of cryolite.

4. A method of producing a sodium aluminum fluoride salt selected from the group consisting of cryolite, chiolite and mixtures of both, which salt is of a predetermined Na:Al ratio and of at least 90% purity from aluminum and fluorine compounds containing materials and comprising the steps of leaching said materials with aqueous sodium hydroxide solution so as to obtain a first solution containing dissolved therein compounds containing the major portion of the fluorine, aluminum and sodium present in alkali-soluble form in said materials and to obtain a solid residue; separating said first solution from said solid residue of said materials; leaching said solid residue with aqueous hydrofluoric acid so as to obtain a second solution containing dissolved therein compounds including aluminum and fluorine and also to obtain another solid residue; separating said second aqueous solution from said other solid residue; and combining a determined quantity of said first solution with a determined quantity of said second solution, the respective quantities of said first and second solutions each containing determined concentrations of aluminum, fluorine and sodium, respectively, being so chosen that the relative quantities of sodium, aluminum and fluorine, respectively, in the combined mixture of said first and second solutions correspond to the stoichiometric ratio of Na:Al:F in the desired sodium aluminum fluoride salt, thereby forming a precipitate consisting essentially of said salt.

5. The method as described in claim 4, characterized in that media of coagulation from the group consisting of starch, gelatine and buttermilk are added to the digested material obtained by leaching said aluminum and fluorine compounds containing materials with aqueous sodium hydroxide solution, to accelerate the sedimentation of the undissolved residue and that the latter is then separated from said alkaline lye.

6. The method described in claim 4, characterized in that the leaching of said solid residue is effected with an aqueous hydrofluoric acid containing between 10 to 40% of HF and at temperatures between about 30–60° C.

7. The method described in claim 1, characterized in that an aluminum fluoride solution prepared from aluminum hydroxide and hydrofluoric acid is added to the mixture of said first and second solutions so as to cause a secondary precipitate of said sodium aluminum fluoride salt therein.

8. In a method for the production of a sodium aluminum fluoride salt selected from the group consisting of cryolite, chiolite and mixtures of both, which salt is of a predetermined Na:Al ratio and of at least 90 percent purity, from starting materials containing compounds of aluminum with fluorine, comprising the steps of digesting the starting material with an aqueous sodium hydroxide solution so as to obtain an alkaline lye containing dissolved therein compounds of fluorine, aluminum and sodium present in alkali-soluble form in said materials, separating the resultant alkaline lye from the undissolved residue, adding to the resulting lye hydrofluoric acid so as to neutralize said lye and thereby precipitating a sodium aluminum fluoride salt containing the desired Na:Al ratio, and leaving an excess of sodium and fluoride ions in that neutralized lye, the step of adding to the neutralized lye wherein said first precipitate of said sodium aluminum fluoride salt had been formed, a solution of aluminum fluoride in water in the amount stoichiometrically required to complement the content of sodium and fluoride ions dissolved in said lye, thereby causing a secondary precipitation of said sodium aluminum fluoride salt in said neutralized lye.

9. A method for the production of a sodium aluminum fluoride salt selected from the group consisting of cryolite, chiolite and mixtures of both, which salt is of a predetermined Na:Al ratio and of at least 90% purity, from a material containing aluminum, fluorine and sodium values, said values being in a relative concentration to one another, based on 100 parts by weight, of about 13–43 parts aluminum, about 32–55 parts fluorine and about 25–37 parts sodium, comprising the steps of digesting said materials with an aqueous sodium hydroxide solution so as to obtain an alkaline lye containing dissolved therein compounds of fluorine, aluminum and sodium present in alkali-soluble form in said materials, separating the resultant alkaline lye from the undissolved residue, and adding to the resulting lye, aluminum- and fluorine-containing compounds wherein at least part of said fluorine-containing compounds consists of hydrofluoric acid in sufficient amounts to neutralize said lye, the aluminum content and the fluorine content of said added compounds being such as to establish the aforesaid predetermined ratio of Na:Al in said lye, thereby precipitating substantially the entire amount of sodium ions, aluminum ions and fluorine ions present in the resultant lye containing neutralized compounds in the form of the sodium aluminum fluoride salt having the desired Na:Al ratio.

10. A method for the production of a sodium aluminum fluoride salt selected from the group consisting of cryolite, chiolite and mixtures of both, which salt is of a predetermined Na:Al ratio and of at least 90% purity, from a material containing aluminum, fluorine and sodium values, said values being in a relative concentration to one another, based on 100 parts by weight, of about 13–43 parts aluminum, about 32–55 parts fluorine and about 25–37 parts sodium, comprising the steps of digesting said materials with an aqueous sodium hydroxide solution so as to obtain an alkaline lye containing dissolved therein compounds of fluorine, aluminum and sodium present in alkali-soluble form in said materials, separating the resultant alkaline lye from the undissolved residue, and adding to the resulting lye, in combination, aluminum fluoride and hydrofluoric acid, the latter in a sufficient amount to neutralize said lye, the aluminum content and the fluorine content of said added combination of substances being such as to establish the aforesaid predetermined ratio of Na:Al in said lye, thereby precipitating substantially the entire amount of sodium ions, aluminum ions and fluorine ions present in the resultant neutralized, added-substances-containing lye in the form of the sodium aluminum fluoride salt having the desired Na:Al ratio.

11. A method for the production of a sodium aluminum fluoride salt selected from the group consisting of cryolite, chiolite and mixtures of both, which salt is of a predetermined Na:Al ratio and of at least 90% purity, from a material containing aluminum, fluorine and sodium values, said values being in a relative concentration to one another, based on 100 parts by weight, of about 13–43 parts aluminum, about 32–55 parts fluorine and about 25–37 parts sodium, comprising the steps of preparing a mixture by adding to said materials, an aluminum-containing material of high aluminum content selected from the group consisting of aluminum dross, aluminum metal waste, and easily digestible aluminum ore, so as to raise the total aluminum content of the said mixture, digesting said mixture with an aqueous sodium hydroxide soltuion so as to obtain an alkaline lye containing dissolved therein compounds of fluorine, aluminum and sodium present in alkali-soluble form in said mixture, separating the resultant alkaline lye from the undissolved residue, and adding to the resulting lye a combination of aluminum- and fluorine-containing compounds, wherein at least part of said fluorine-containing compounds consists of hydrofluoric acid in a sufficient amount to neutralize said lye, the aluminum content and the fluorine content of said added combined compounds being such as to establish the aforesaid predetermined ratio of Na:Al in said lye, thereby precipitating substantially the entire amount of sodium ions, aluminum ions and fluorine ions present in the resultant neutralized compounds-containing lye in the form of the sodium aluminum fluoride salt having the desired Na:Al ratio.

12. In a method for the production of a sodium aluminum fluoride salt selected from the group consisting of cryolite, chiolite and mixtures of both, which salt is of a predetermined Na:Al ratio and of a least 90 percent purity, from aluminum and fluorine compounds containing materials having a low aluminum content relative to the sodium and fluorine content thereof, comprising the steps of digesting said materials with an aqueous sodium hydroxide solution so as to obtain an alkaline lye containing dissolved therein compounds of fluorine, aluminum and sodium present in alkali-soluble form in said materials, separating the resultant alkaline lye from the undissolved residue, adding to the resulting lye hydrofluoric acid so as to neutralize said lye and thereby forming in said lye a first precipitate of the sodium aluminum fluoride salt containing the desired Na:Al ratio, and leaving an excess of sodium and fluoride ions in the neutralized lye, the steps of preparing a mixture by adding to said materials, an aluminum-containing material of high aluminum content selected from the group consisting of aluminum dross, aluminum metal waste, and easily digestible aluminum ore, so as to raise the total aluminum content of said mixture, and adding to the neutralized lye wherein said first precipitate of said sodium aluminum fluoride salt had been formed, a solution of aluminum fluoride in water in the amount stoichiometrically required to complement the content of sodium and fluoride ions dissolved in said lye, thereby causing a secondary precipitation of said sodium aluminum fluoride salt in said neutralized lye.

13. A method for the production of a sodium aluminum fluoride salt selected from the group consisting of cryolite, chiolite and mixtures of both, which salt is of a predetermined Na:Al ratio and of at least 90 percent purity from starting materials containing compounds of aluminum with fluorine, comprising the steps of digesting the starting material with an aqueous sodium hydroxide solution so as to obtain an alkaline lye containing dissolved therein compounds of fluorine, aluminum and sodium present in alkali-soluble form in said materials, separating the resultant alkaline lye from the undissolved residue, and adding to the resulting lye, in combination, aluminum- and fluorine-containing compounds wherein at least part of said fluorine-containing compounds consists of hydrofluoric acid in sufficient amounts to neutralize said lye, the aluminum content and the fluorine content of said added compounds being such as to establish a ratio of Na:Al slightly larger than the aforesaid predetermined ratio of Na:Al in said lye, thereby precipitating almost the entire amount of sodium ions, and fluorine ions, and substantially the entire amount of aluminum ions present in the resultant neutralized-compounds-containing lye in the form of a first precipitate of the sodium aluminum fluoride salt having the desired Na:Al ratio; and adding to the neutralized lye wherein said first precipitate of said sodium aluminum fluoride salt had been formed, a solution of aluminum fluoride in water in the amount stoichiometrically required to complement the content of sodium and fluoride ions dissolved in said lye, thereby causing a secondary precipitation of said sodium aluminum fluoride salt in said neutralized lye.

14. The method as described in claim 9, further comprising the step of separating said precipitated sodium aluminum fluoride salt from said mother liquor while said mother liquor still has a temperature of about 30 to 40° C., and passing said mother liquor having said temperature through heat exchanger means counter-currently to said alkaline lye from said digesting step having a temperature of 90 to 100° C., thereby heating said mother liquor to a temperature between 80 and 90° C., and preparing said aqueous sodium hydroxide solution with a concentration of 3 to 5% NaOH, from a concentrated sodium hydroxide solution having a concentration of about 50% NaOH by diluting the latter with said mother liquor heated to said temperature between 80 and 90° C., thereby obtaining said aqueous sodium hydroxide solution having a concentration of 3 to 5% NaOH.

15. The method as described in claim 9, further comprising the step of separating said precipitated sodium aluminum fluoride salt from its mother liquor while said mother liquor still has a temperature of about 30 to 40° C., and passing said mother liquor having said temperature through heat exchanger means counter-currently to said neutralized lye containing the precipitated sodium aluminum fluoride salt in suspension and having a temperature of 85 to 100° C., thereby heating said mother liquor to a temperature between 80 and 90° C., and preparing said aqueous sodium hydroxide solution with a concentration of 3 to 5% NaOH, from a concentrated sodium hydroxide solution having a concentration of about 50% NaOH by diluting the latter with said mother liquor heated to said temperature between 80 and 90° C., thereby obtaining said aqueous sodium hydroxide solution having a concentration of 3 to 5% NaOH.

16. A preliminary treatment of aluminum and fluorine compounds containing materials used in the method as described in claim 9, comprising the steps of exposing said materials to the influence of moist air by storage therein and of then grinding said materials to a grain size smaller than 1 mm.

References Cited in the file of this patent
UNITED STATES PATENTS

| | | |
|---|---|---|
| 1,871,723 | Morrow | Aug. 16, 1932 |
| 1,873,727 | Specketer et al. | Aug. 23, 1932 |
| 2,058,075 | Gaither | Oct. 20, 1936 |
| 2,186,433 | Schwemmer | Jan. 9, 1940 |
| 2,196,077 | Morrow | Apr. 2, 1940 |
| 2,516,884 | Kyame | Aug. 1, 1950 |
| 2,597,302 | Dale | May 20, 1952 |